United States Patent [19]

Cretin et al.

[11] Patent Number: 4,523,191

[45] Date of Patent: Jun. 11, 1985

[54] DEVICE FOR INTERCONNECTING A SERIES OF DATA ACQUISITION APPARATUSES TO A REMOTE RECEIVING AND RECORDING SYSTEM

[75] Inventors: Jacques Cretin, Le Chesnay; Claude Beauducel, Henouville, both of France

[73] Assignees: Institut Francais du Petrole, Rueil-Malmaison; Compagnie Generale de Geophysique, Massy, both of France

[21] Appl. No.: 404,092

[22] Filed: Jul. 30, 1982

[30] Foreign Application Priority Data

Jul. 30, 1981 [FR] France .................. 81 15008

[51] Int. Cl.³ .......... H04Q 9/00; G01V 1/22
[52] U.S. Cl. .................. 340/825.52; 367/20
[58] Field of Search .......... 340/825.08, 825.52; 375/36; 370/85; 367/20

[56] References Cited

U.S. PATENT DOCUMENTS

| | | | |
|---|---|---|---|
| 3,441,902 | 4/1969 | Savit | 367/20 |
| 4,016,369 | 4/1977 | Pedersen | 340/825.52 |
| 4,091,358 | 5/1978 | Bayhi | 367/20 |
| 4,253,087 | 2/1981 | Saal | 340/825.52 |
| 4,398,271 | 8/1983 | Cretin et al. | 367/20 |

Primary Examiner—Donald J. Yusko
Attorney, Agent, or Firm—Millen & White

[57] ABSTRACT

A device is provided for interconnecting a series of data acquisition apparatuses. Each of the apparatuses collect signals and transmit them to a remote central receiving and recording system. In order to sequentially transmit the signals thereto on reception of an order from said central system, the apparatuses are subdivided into a plurality of groups having the same number m of apparatuses. The groups comprise cable sections of substantially equal length interconnecting the acquisition apparatuses in such a manner that the apparatuses of the same rank of each group are connected in parallel by the same transmission cable to the central system.

6 Claims, 4 Drawing Figures

DEVICE FOR INTERCONNECTING A SERIES OF DATA ACQUISITION APPARATUSES TO A REMOTE RECEIVING AND RECORDING SYSTEM

BACKGROUND OF THE INVENTION

This invention relates to a device for interconnecting a series of data acquisition apparatuses to a remote receiving and recording central system.

More particularly the invention concerns a device for interconnecting a series of electronic apparatuses, each of which is adapted to collect analog signals generated by a plurality of signal generators, to convert them to digital signals and to transmit them sequentially to a remote receiving and recording system, this interconnection device having a high transmission capacity.

The interconnection devices of a known type generally comprise one or more data transmission lines onto which can be connected a plurality of electronic data acquisition apparatuses. Each of them is adapted to collect, by sequential sampling, a plurality of analog signals generated by a certain number of generators and to memorize them temporarily. The receiving and recording system is adapted to successively interrogate the different acquisition apparatuses. Upon reception of appropriate control signals, each acquisition apparatus is connected onto the one or more transmission lines in order to transmit the locally collected data to the receiving and recording system.

The interconnection devices of this type are, for example, used in seismic prospecting to transmit to a remote recording system the seismic signals collected from a very large number of sensors or sensor groups distributed along the seismic profile on survey and corresponding to the echoes, on subterranean reflecting surfaces, of seismic signals transmitted intermittently. The sensors or sensor groups are distributed in several assemblies respectively connected to electronic seismic data acquisition devices connected at regular intervals onto the transmission lines. In marine seismic prospecting, particularly, the sensor assemblies are contained in sections of a seismic streamer of great length, towed, while immersed, behind a ship, for example. The acquisition apparatuses of the signals generated by each of the sensor assemblies are also arranged at regular intervals inside the seismic streamer and are connected to a receiving and recording system placed on the towing ship, through one or more transmission lines. The transfer of the seismic signals comprises a first analog multiplexing, effected by each acquisition apparatus for sequentially collecting the seismic signals received by the sensors of each sensor assembly, then a second digital multiplexing effected by the receiving and transmitting system, in order to successively transmit the data collected from the different acquisition apparatuses onto the one or more common transmission lines.

Such an interconnection device is described, for example, in the French patent application E. No. 79/30 287. It comprises two "outward" transmission lines and two "inward" transmission lines serially connecting a plurality of data acquisition apparatuses to a receiving, recording and testing system placed on a towing chip.

The data transmission lines used in practice consist generally of a pair of twisted conductor wires whose transmission capacity is about 2 Megabits/s. This transmission capacity is compatible with the bandwidth of the logic electronic elements (for example of the C MOS type) generally used in the data acquisition apparatuses. However, when increasing the number of interconnected acquisition apparatuses on the same transmission line or lines, the bulk of informations passing therethrough or processed by the electronic elements of these acquisition apparatuses, becomes quickly incompatible with the performances of the currently used equipment. This leads to the requirement of use of transmission lines in the form of coaxial cables and of electronic logic elements of higher performance. As a result the electric consumption and the manufacturing costs are substantially increased.

SUMMARY OF THE INVENTION

The interconnection device according to the invention connects, through transmission cables, to a central receiving and recording system, a series of data acquisition devices, each adapted to collect signals generated by a particular group of signal generators (combinations of seismic sensors, for example) and to transmit them sequentially to the receiving and recording central system when receiving an order therefrom transmitted to the data acquisition apparatuses through the transmission cables, these acquisition apparatuses being interconnected through transmission cable sections of substantially constant length.

It is characterized in that the series of data acquisition apparatuses is subdivided into a plurality of assemblies, each comprising the same number m of consecutive data acquisition apparatuses of the series, the acquisition apparatuses of same rank of all the assemblies being connected in parallel, through the same transmission cable, to the central receiving and recording system.

The number of acquisition apparatuses of each assembly may be equal to or lower than the number of transmission cables.

Multiplexing means may be included in the receiving and recording system for sequentially connecting to the recording means included in the receiving and recording central system the transmission cable joining the acquisition apparatuses.

The interconnection device according to the invention makes it possible, by the use of cables formed of conventional transmission lines with twisted conductors pairs and logic electronic elements of usual type, and by limiting the number of data acquisition apparatuses interconnected onto the same transmission line to a number compatible with the transmission capacity thereof, to transfer to the central receiving and recording system an increased bulk of data and consequently, to multiply the number of apparatuses which may sequentially transmit data to said system.

In the field of seismic prospecting, for example, the device according to the invention makes it possible to increase the length of the seismic echoes receiving device and/or the number of recording "traces" without requiring a modification in the performances of the existing equipment.

BRIEF DESCRIPTION OF THE DRAWING

Other characteristics and advantages of the device will be made apparent from the following description of the preferred by nonlimitative embodiment, given with reference to the accompanying drawings wherein.

DETAILED DISCUSSION OF THE INVENTION

Figure 1:
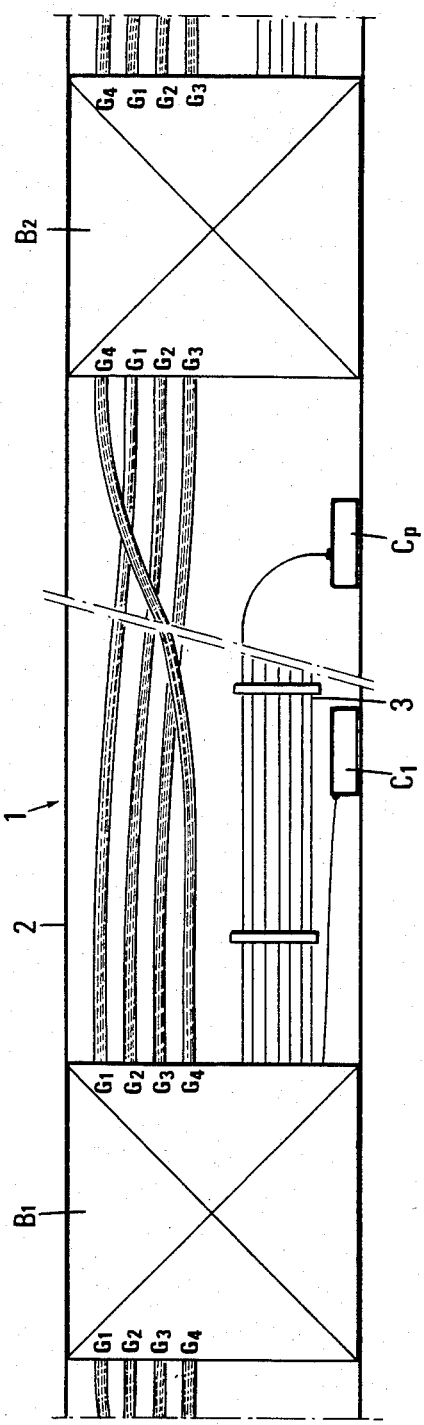
FIG. 1 diagrammatically shows a seismic streamer section containing seismic receivers and connected at its both ends with a box containing an acquisition apparatus of seismic data generated by receivers located in the streamer section of the adjacent section, as well as cables joining or interconnecting the two boxes.

The seismic streamer section 1, shown in FIG. 1, comprises a plurality of seismic receivers $C_1 \ldots C_p$ placed inside of a tight sheath 2, and adapted to sense acoustic waves generated by a seismic source and reflected or diffracted by different subterranean layers. These seismic receivers of the same steamer section are grouped in a certain number of sub-assemblies and the outputs of the receivers of each sub-assembly are interconnected in a series and/or in parallel, as it is well known in the art. The seismic streamer section is connected at one of its ends to a tight box $B_1$, $B_2$... containing a seismic data acquisition apparatus.

The signal generators formed by the seismic receivers of each streamer section are connected to one or the other of the acquisition apparatuses contained in boxes $B_1$, $B_2$, arranged at the ends of a conductor bundle 3.

Moreover, each streamer section is traversed by an assembly of four transmission cables $G_1$, $G_2$, $G_3$, $G_4$. In accordance with the type of data acquisition apparatus, each of the transmission cables may comprise one or more pairs of twisted conductor wires, adapted to transmit to each acquisition apparatus connected onto this cable orders emanating from the receiving and recording system and, in return, to transmit thereto the sequences of seismic data emanating from the different acquisition apparatuses interconnected through this cable.

Figure 2:
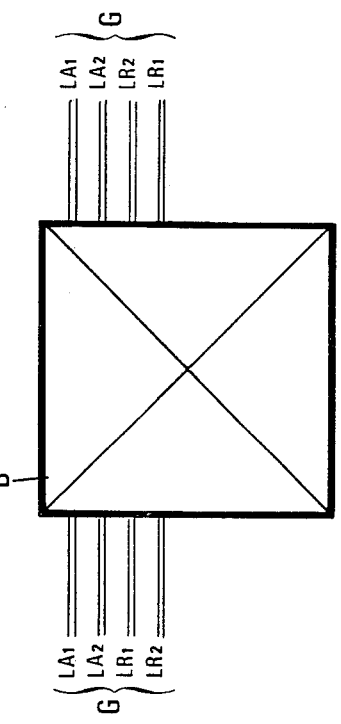
FIG. 2 diagrammatically shows an example of embodiment of a transmission cable.

When using data acquisition apparatuses and a transmission device such as those described in the above-mentioned French patent application E. No. 79/30 287, each transmission cable G emanating from any box B will comprise (FIG. 2) two twisted pairs of conductors $LA_1$ and $LA_2$ forming two "outward" transmission lines and two other twisted pairs of conductors $LR_1$, $LR_2$ forming two "inward" transmission lines.

Figure 3:
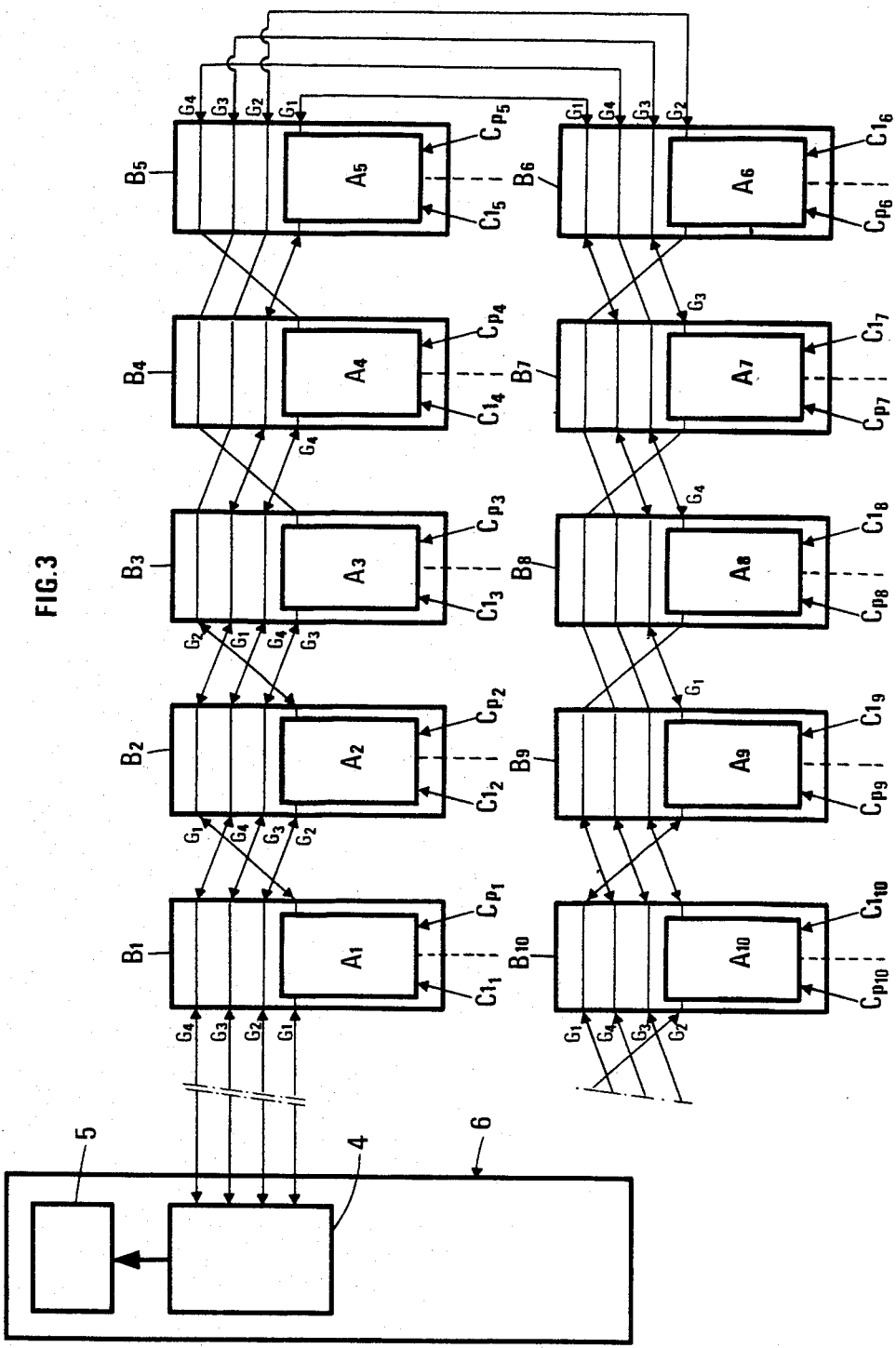
FIG. 3 diagrammatically shows a portion of the series of data acquisition apparatuses connected to the central data receiving system through the interconnection device according to a first embodiment.

The fire boxes $B_1$, $B_2 \ldots B_{10}$ shown in FIG. 3 respectively contain apparatuses $A_1$, $A_2 \ldots A_{10}$ for the acquisition of seismic data supplied by combinations of sensors forming the signals generators. The acquisition apparatus $A_1$ is adapted to effect a first analog multiplexing of the signals generated by p combinations of sensors $C_{11}$, $C_{21} \ldots C_{p1}$, to digitize and memorize the signal samples, and to sequentially transmit the digitized data to the receiving and recording system 6, upon reception of an appropriate control signal emanating therefrom through the intermediary of a transmission cable. The acquisition apparatus $A_2$ effects the same operations on signals delivered by other sensor combinations $C_{12}$, $C_{22}$ ... $C_{p2}$, to digitize and memorize the signal samples, and to sequentially transmit the digitized data to the receiving and recording system 6, upon reception of an appropriate control signal emanating therefrom through the intermediary of a transmission cable. Similarly, the acquisition apparatuses $A_3$, $A_4 \ldots A_{10}$ process the signals respectively generated by the combinations $(C_{13}, C_{23} \ldots C_{p3})(C_{14}, C_{24} \ldots C_{p4}) \ldots (C_{110}, C_{210} \ldots C_{p10})$, etc ..

The series of all the data acquisition apparatuses of the seismic streamer $A_1, A_2 \ldots A_5 \ldots A_{10} \ldots$ is subdivided into a plurality of assemblies, each comprising four consecutive apparatuses (m=4 in this case). The first assembly consists of the acquisition apparatuses $A_1$, $A_2$, $A_3$, $A_4$, the second assembly of the apparatuses $A_5$, $A_6$, $A_7$, $A_8$, the third group comprising the apparatuses $A_9$, $A_{10}$, etc ... The device comprises four transmission cables $G_1$, $G_2$, $G_3$ and $G_4$ (n=4 also this case). The cable $G_1$ is connected to the first acquisition apparatus $A_1$ of the first assembly and then paases through the boxes $B_2$, $B_3$, $B_4$ without interruption before being connected to the first acquisition apparatus $A_5$ of the second assembly. After having traversed without interruption of the boxes $B_6$, $B_7$, $B_8$, it is again connected to the first acquisition apparatus $A_9$ of the third assembly, then to all the apparatuses of first rank of the following assemblies: $A_{13}$, $A_{17}$ etc . . . (apparatuses not shown). Similarly, cable $G_2$ is connected first to the second acquisition apparatus $A_2$ *of the first assembly, then to apparatuses $A_6$,* $A_{10}$ and to apparatuses $A_{14}$, $A_{18}$, etc ... (not shown) having the same rank in their respective assemblies, while passing without interruption through the intermediary boxes.

The same is true for cable $G_3$ which interconnects the acquisition apparatuses $A_3$, $A_7$ and also the apparatuses $A_{11}$, $A_{15}$, etc ... (not shown) having the third rank in all the successive assemblies, and this is true also for cable $G_4$ interconnecting the acquisition apparatuses $A_4$, $A_8$, as well as apparatuses $A_{12}$, $A_{16}$, etc . . . (not shown) having the fourth rank in all the successive assemblies.

The four cables $G_1$, $G_2$, $G_3$, $G_4$ are connected to the receiving and recording system 6 comprising an additional multiplexer 4 adapted to sequentially transmit to a recorder 5 the digitized data conveyed through the four cables.

By multiplying by four and more generally by n (n=2, 4 . . .) the number of data transmission cables and by including a digital multiplexer of high speed such as 4 in the receiving and recording system 6, it is possible to multiply by the same number the bulk of seismic information liable to be transferred in said system, without modifying the existing acquisition apparatuses included in the seismic streamer.

The interconnection device according to the invention may easily be adapted to a change in the distribution of the acquisition apparatuses, justified by a modification in the number of signal generators (groups including each a certain number of electrically interconnected consecutive seismic receivers, for example) which must transmit their signals to the receiving and recording system 6. When the total number of receiver groups contained in each streamer section is equal to the number of channels to which an acquisition apparatus can be joined up, it is necessary to interpose such an apparatus between two successive sections. But if, for example, the number of signal generators contained in each section or selected therein is divided by two, each acquisition apparatus may collect the signals generated by all the generators of two consecutive sections.

Figure 4:
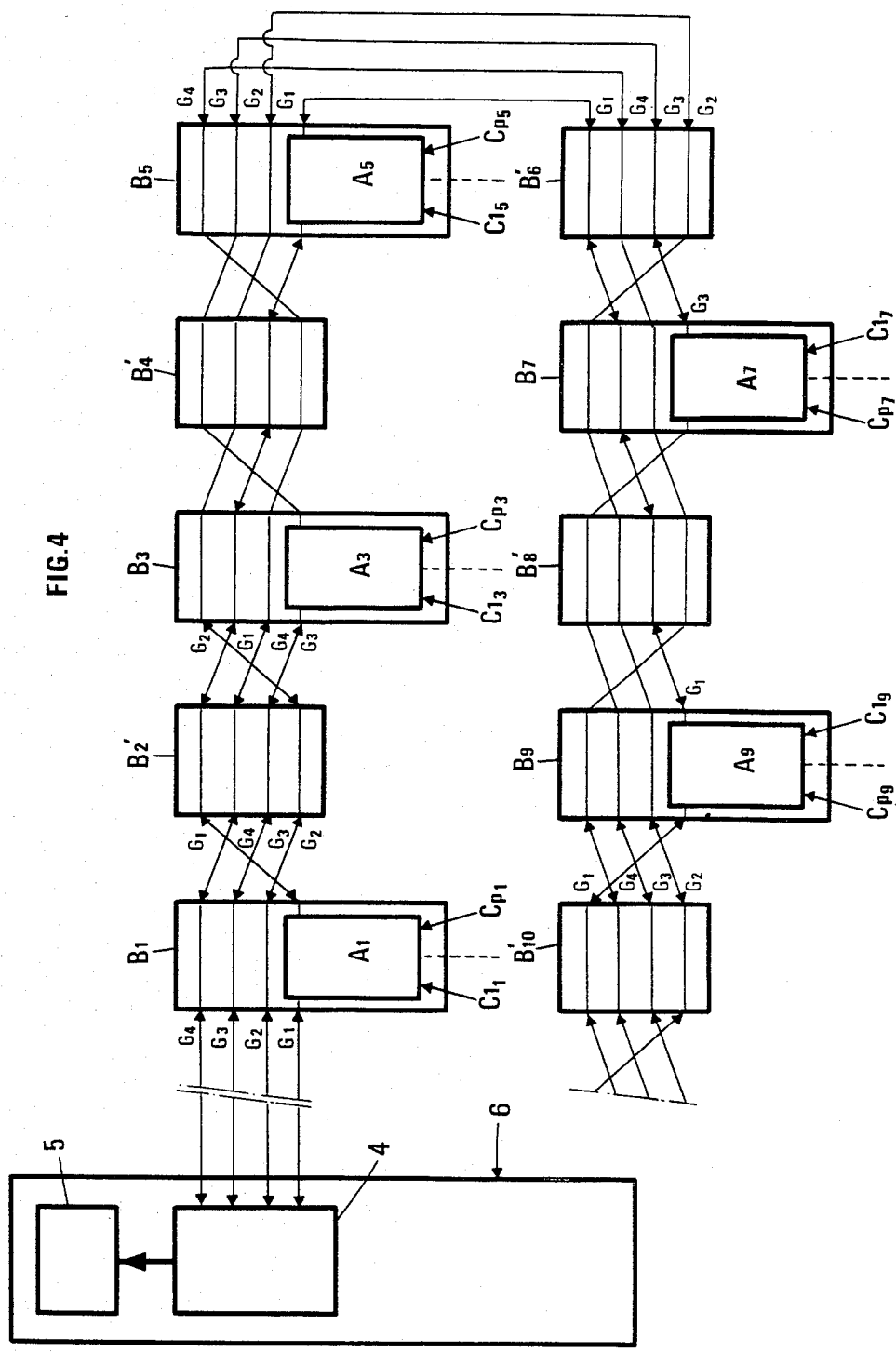
FIG. 4 diagrammatically shows a portion of the series of data acquisition apparatuses connected to the data receiving central system through the interconnection device according to a second embodiment.

In this case, the device according to the invention is modified as shown in FIG. 4.

The boxes of even numbers for example $B_2$, $B_4$ . . . $B_{2n}$, each containing an acquisition electronic apparatus, are replaced by inactive boxes $B'_2$, $B'_4 \ldots B'_{10} \ldots$ $B'_{2n}$ whose inputs and outputs are always respectively electrically connected through four cable sections, so as to ensure the electric continuity of the cable sections $G_1$, $G_2$, $G_3$, $G_4$ contained in the successive streamer sections. The boxes of odd numbers $B_1$, $B_3$, $B_5 \ldots B_9 \ldots B_{2n+1}$ are maintained in place and electrically interconnected in the same manner as in the preceding embodiment. The assembly of all the acquisitions apparatuses $A_1$, $A_3$, $A_5 \ldots A_{2n+1}$ contained in boxes of odd numbers is divided into a plurality of assemblies each comprising two successive apparatuses ($m=2$ in this case). The first one consists of the apparatuses $A_1$, $A_3$, the second of apparatuses $A_5$, $A_7$, the third of apparatuses $A_9$, $A_{11}$ (not shown), etc . . . The apparatuses of rank 1 of each of the groups ($A_1$, $A_5$, $A_9$, etc . . .) are interconnected through cable $G_1$ and the apparatuses of rank 2 of each of the groups ($A_3$, $A_7$, $A_{11}$ (not shown), etc . . .) are interconnected through cable $G_3$. Cables $G_2$ and $G_4$ are not used in this case to transmit to the recording system 6 the data collected by the acquisition apparatuses. The additional multiplexer 4, used for transmitting to the recorder 5 the data supplied by the acquisition apparatuses, may be modified in order to connect only the two cables $G_1$, $G_3$ effectively used.

What is claimed is:

1. An interconnection arrangement for connecting a series of data acquisition devices to a remote central receiving and recording system through a plurality of transmission cables, each device being operative for collecting signals generated by a particular set of signal generators and for transmitting said collected signals sequentially to said central receiving and recording system upon reception of a command control signal emanating from said system and transmitted to the data acquisition devices by said transmission cables, the data acquisition devices being interconnected by transmission cable sections of substantially equal length, and the series of data acquisition devices being subdivided into a plurality of groups, each group comprising the same number m of data acquisition devices, with the groups being consecutively arranged in the series, the respective single data acquisition devices of the same rank of each one of the groups being connected in parallel by a single transmission cable to the central receiving and recording system, and the data acquisition devices of different ranks in all the groups being connected by different transmission cables to the central receiving and recording system.

2. An interconnection arrangement according to claim 1, wherein the number m of acquisition devices of each group is equal to the number n of transmission cables, and the data acquisition devices of the same group are connected to respective ones of the transmission cables.

3. An interconnection arrangement according to claim 1, wherein the number m of acquisition devices of each group is equal to half the number of transmission cables, the acquisition devices of each respective group being connected to respective ones of said m transmission cables selected from all of the cables, and connection means interposed in the transmission cables between the respective acquisition devices of the same group.

4. An interconnection arrangement according to claim 1, wherein the receiving and recording system comprises recording means and multiplexing means for sequentially connecting to the recording means the transmission cables connected to the series of acquisition devices.

5. An interconnection arrangement according to claim 1, wherein said receiving and recording system is adapted to transmit a control signal to cause respective acquisition device to transmit the collected signals to the receiving and recording system.

6. An interconnection arrangement according to claim 5, wherein the respective acquisition devices of the same rank in the different groups are connected in parallel by to two twisted pairs of conductors $LA_1$ and $LA_2$ making up outward transmission lines for transmitting signals to the receiving and recording system and two twisted pairs of conductors $L_{R1}$ and $L_{R2}$ making up inward transmission lines for receiving control signals from said receiving and recording system.

* * * * *